United States Patent [19]

Fischer et al.

[11] Patent Number: 4,876,611
[45] Date of Patent: Oct. 24, 1989

[54] PROCESS FOR RECORDING SEMIHALFTONE IMAGES

[75] Inventors: Gerhard Fischer, Offenbach; Helmut Quabeck, Babenhausen, both of Fed. Rep. of Germany

[73] Assignee: E. I. Du Pont De Nemours and Company, Wilmington, Del.

[21] Appl. No.: 98,941

[22] Filed: Sep. 21, 1987

[30] Foreign Application Priority Data

Oct. 14, 1986 [DE] Fed. Rep. of Germany ....... 3634939

[51] Int. Cl.$^4$ .......................... H04N 1/23; H04N 1/46
[52] U.S. Cl. ...................................... 358/456; 358/298
[58] Field of Search .............................. 358/283, 298

[56] References Cited

U.S. PATENT DOCUMENTS

| | | | |
|---|---|---|---|
| 4,075,663 | 2/1978 | Wellendorf | 358/283 |
| 4,482,923 | 11/1984 | Fischer et al. | |
| 4,485,397 | 11/1984 | Scheuter et al. | |
| 4,500,919 | 2/1985 | Schreiber | 358/80 |
| 4,531,160 | 7/1985 | Ehn | 358/298 |
| 4,547,812 | 10/1985 | Waller | 358/283 |
| 4,556,918 | 12/1985 | Yamazaki | 358/283 |
| 4,561,025 | 12/1985 | Tsuzuki | 358/298 |
| 4,578,713 | 3/1986 | Tsao et al. | |
| 4,651,228 | 3/1987 | Koch | 358/296 |
| 4,651,287 | 3/1987 | Tsao | 358/283 |
| 4,686,538 | 8/1987 | Kouzato | 358/298 |
| 4,736,253 | 4/1988 | Shida | 358/298 |

FOREIGN PATENT DOCUMENTS 0132453  2/1985  European Pat. Off.
2017960  10/1971  Fed. Rep. of Germany.
0163959  9/1984  Japan.

OTHER PUBLICATIONS

Karl R. Scheuter et al., "Frequency Modulated Picture ... Distribution", pp. 1-12, Sep. 14, 1984, Cambridge, England.
Karl R. Scheuter et al., "Frequency Modulated Screening", GATF Technical Forum, 1985, pp. 1-13, FIGS. 1-13, Pitts, PA.

Primary Examiner—Edward L. Coles, Sr.
Assistant Examiner—Jerome Grant
Attorney, Agent, or Firm—John E. Griffiths

[57] ABSTRACT

A process involving scanning an original linewise and determining the tonal value of each scan dot. Multiple scan dots are collected into a scan field. The average tonal value of each scan field is determined by averaging the tonal values of the scan dots of that scan field. The original is reproduced on a recording medium by individual recording dots that can take the tone value "print" or "no-print". Several recording dots correspond to a scan field of the original. The tone value of the scan field can be reproduced almost exactly on the average by printing a specific number of recording dots. The distribution of recording dots to be printed for a scan field is determined by subdivision of the scan field into the smallest subfields. In this process, the scan field is subdivided in at least one subdividing step into these smallest subfields, the average tonal value of each resulting subfield being determined so that the number of recording dots to be printed in all subfields of a scan field correspond to the average tonal value of the scan field.

22 Claims, 6 Drawing Sheets

PROCESS FOR RECORDING SEMIHALFTONE IMAGES

BACKGROUND OF THE INVENTION

1. Field of the Invention

The subject of the invention is a process for recording semihalftone images. In this process, an original is analyzed by scan-resolution and divided into a number of scan fields each with k scan dots, the average tonal value of each scan field is determined, and the original is reproduced on a recording medium with image resolution effected by individual recording dots with the tone value "print" (on) or "no-print" (off).

2. Description of the Related Art

With this type of process, originals, for example, black and white transparencies, can be reproduced by dots recorded on a recording medium, such as, for example, a sheet of paper, a printing plate of a fluorescent screen. The recorded dots can be only black or white. The various shades of gray ranging from black to white in an original are achieved on the recording medium by varying the black recording dots as a function of the desired gray steps. This means that all recording dots of a black area of the original are black in the reproduction, while the proportion of white recording dots located among the black recording dots increases with decreasing blackness. For the light grey areas of the original, the recording medium shows a low frequency of black recording dots, until ultimately, all recording dots are white, that is, not printed, for the white areas.

There are known process in which the individual recording dots of the gray scale of the original are correspondingly more or less toned. With such processes, each step of the grey scale can be reproduced on the recording medium. However, if the original should be reproduced by means of recording dots that can take the tone value of either "print" (black) or "no-print" "empty" (white), the use of the above image recording method is not possible. The various gray shades can also be reproduced with recording dots that can take only two tone values in two ways. The dots may be placed on constant center distances but vary in size thus covering more or less of a given area and creating the appearance of the various densities of a gray scale. This is the traditional halftone imaging system widely accepted by the printing industry. Another way of creating the various gray levels is by varying the area frequency of print (or no-print) recording dots of a constant size. Hence, these are known as "semihalftone images" in which the gray steps of the gray scale are reproduced according to a previously selected classification into gray gradations. The processing of such semihalftone images with the aid of the digital technique is very simple, because the binary method can be used for image processing ("1" for a print and "0" for a no-print image dot).

A process for the recording of semihalftone images is known from EP-A-0 132 453. This process minimizes errors in the digital processing of electronic signals and is illustrated with the aid of an image recording process. In the known process, an original is analyzed by scanning linewise and dotwise within each line. The gray shade or generally, the tonal value for each scan dot of the original is determined and stored. The tonal value of a scan dot is determined by means of a tonal value scale subdivided into 256 tonal value steps. A scan field consists of a number of scan dots arranged in a matrix and is reproduced on a recording medium by a specific number of recording dots which are arranged in the form of a matrix and which can take either the tone value "print" or the tone value "no-print".

In the known process, a scan dot of the original is supposed to be reproduced by 16 recording dots on the recording medium. This means that the 256 tonal values of the original are reproduced by 16 tonal values on the recording medium. The 16 gray steps in the reproduction results from a number of the 16 recording dots being printed, this number corresponding to the tonal value steps of the scan dots. In the conversion of the tonal value steps of the original into those tonal value steps, which are reproduced on the recording medium, relatively large errors occur. In order to minimize the errors in the reproduction, more scan dots are sometimes collected into a scan field, the average tonal value step of which is reproduced as accurately as possible (average tonal value step being the average of the tone values of all scan dots of the scan field). Each individual scan dot of the scan field can thus be reproduced with quite a relatively large error, while the average tonal value step of the scan field is reproduced relatively accurately.

The known process shows very extensive calculations to minimize errors, which are made in the conversion of the tonal value steps of the originals into those of the reproduction medium. In addition, large matrices with data must be processed. Furthermore, the resolution capability of images recorded by this method is limited by the size of the scan dots, with correspondingly more recording dots in the reproduction.

SUMMARY OF THE INVENTION

In accordance with the present invention, there is provided a process for reproducing an image by scanning the image with a scanning dot having a predetermined area to obtain information related to the tonal values of the image, and using the information to reproduce the image on a display medium by generating a multiplicity of recording dots of fixed predetermined tonal value and dimension, and of variable frequency per unit area, the improvement comprising:

(1) detecting discrete tonal values for discrete areas of the image corresponding to the scanning dot area, (2) storing information corresponding to the discrete tonal values for the full image area to be reproduced, (3) defining at least one scanning field equivalent to a portion of an image area, containing k scan dots.

(4) calculating the average tonal value of each scanning field by averaging the tonal values of each of the scanning dots within the field, (5) subdividing each of the scanning fields into at least two subfields, (6) calculating the average tonal value of the subfields such that the sum of the tonal values of the subfields equals the tonal value of the field which preceded the subfields.

(7) repeating steps (5) and (6) until the number of scan dots contained in the subfield equals one or the ratio of the scan dot area to the recording dot area whichever is greater, and (8) generating on the display medium recording dots of fixed tonal value and dimension at a frequency and location to produce tonal values in each of the subfields in accordance with the calculated tonal values for each of the subfields.

BRIEF DESCRIPTION OF THE DRAWINGS

The embodiments of the invention are illustrated in more detail in the following figures. These show in.

DESCRIPTION OF THE PREFERRED EMBODIMENT(S)

Figure 1A:
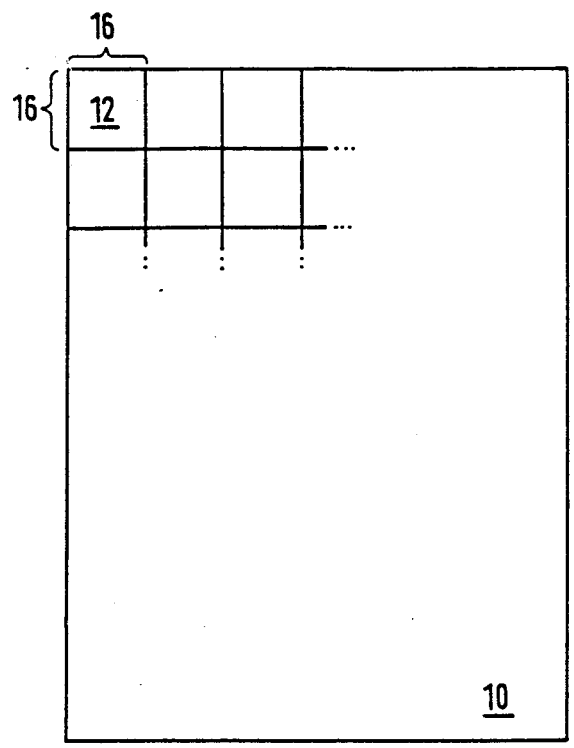
FIGS. 1a to 1i—the individual process steps in recording a two dimensional original by means of the process according to a first embodiment, FIGS. 2a to 2d—the individual process steps in recording a two dimensional original by means of the process according to a second embodiment, FIG. 3—an embodiment of the recording of a two dimensional original, when the scan resolution is twice as great as the recording resolution, and FIG. 4—an embodiment of the recording of a two dimensional original, when the scan resolution is half of the recording resolution.

In accordance with this invention. FIGS. 1a to 1i show individual process steps in recording a two dimensional original 10 in the case where the scan resolution is equal to the recording resolution. This means that one scan dot or discrete area 14 of the original is reproduced by one recording dot on the recording medium of fixed dimension equal in size to the scan dot. For simplicity, the scan and recording dots or elements respectively are represented in quadrangular fields. Actually, the scan and recording dots have a circular surface. Further, let it be assumed for the sake of simplicity that the original to be recorded is a black and white image. In this case, the tonal value of a scan dot corresponds to a specific gray tone (gray step) between the "gray values" of black and white.

The original 10 to be recorded is first scanned linewise in or by a scanning apparatus, for example, a scanner, an electronic camera or similar apparatus. The signal produced by the scanning apparatus for each scan dot represents the tonal value of that particular scan dot. These signals are stored in digital form, so that they are always available during the entire process. The original is reproduced or represented by individual dots (recording dots) on a recording medium, for example, a sheet of paper, a printing plate or a fluorescent screen.

The original 10 is subdivided according to FIG. 1 into scan fields 12, which consist respectively of several scan dots 14. In the reproduction of the original on the recording medium, that is, in the copy of the original, care must be taken to assure the average tonal value of a scan field 12 (that is, the average of the tonal values of all scan dots 14 of a scan field 12) is reproduced as accurately as possible by the recording dots. Practically, about 150 tonal value steps are visually distinguishable by the human eye. In a black and white image, the region between black and white can thus be represented by about 150 gray steps. To display the 150 gray steps through the recording dots on the recording medium, each scan field 12 of the original can be represented on the recording medium by at least 150 recording dots. An individual recording dot can take only the tone value "print". that is, black, or the tone value "noprint", that is, white. The various gray value steps between white and black can be realized by variations in the number of toned (printed) recording dots within an area comprising at least 150 recording dots. Thus, the number of recording dots in a scan field 12 is the sum of the toned (printed) recording dots and the unprinted recording dots in the scan field 12.

The current conventional digital technique for data processing is an obvious choice for subdividing the gray scale into 256 steps. The 256 gray steps can be represented on the recording medium by 256 recording dots, which are arranged in a matrix showing 16 lines and 16 columns. This means that a scan field 12 of the original 10 is reproduced on a recording medium by 256 recording dots arranged in a matrix. The average tone value of a scan field 12 can be reproduced thus almost exactly with an accuracy of $1/256 = 1/2^8$.

As the scan dots and the recording dots are the same size in the first embodiment, the number of scan dots 14 for each scan field is also 256. The diameter of an individual scan or recording dot is 20 $\mu$m for the example, that is, in the simplified representation of scan dots in the figures, one scan dot corresponds to a surface of 20 $\mu$m $\times$ 20 $\mu$m. Therefore, one scan field has a length and width of $16 \times 20$ $\mu$m $= 320$ $\mu$m $\approx 300$ $\mu$m.

To determine the average tonal value of a scan field 12, the analogue signal that is generated by the scanning apparatus for each scan dot and that represents the tonal value of that dot is coded in the binary system with eight bit accuracy. The (continuous) gray scale of the black and white original can be subdivided with the eight bit binary code into 256 gray steps. The subdivision of the gray scale is so fine that the human eye viewing a scan field cannot or can just barely distinguish between two gray values. The continuous gray scale of the original can be reproduced semicontinuously in the recording. Thus the recorded images are semihalftone images.

The average tonal value of the scan field is obtained by addition of the gray values, in binary code, of the scan dots of the scan field and subsequent division by the number of recording dots. It is advantageous to determine the average gray value of the scan field by means of a digital adding device. The addition of the gray values of all scan dots of the scan field, in our case 256 individual gray values, by means of a digital adding device results in a digital number, the highest eight bits of which give not only the average gray value of the scan field with the required accuracy, but also directly the number of recording dots to be printed to represent this gray value. For example, if the average gray value of all 256 recording dots of a scan field is 143, this figure means that, of the 256 recording dots that correspond to the scan field on the recording medium, 143 recording dots must be printed. Nothing can yet be stated about the division of the recording dots within the recording dot matrix to be printed. This subdivision is determined by means of the process steps described in the following.

Figure 1B:
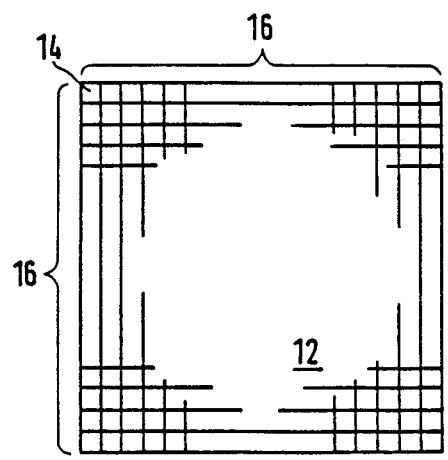
Figure 1C:
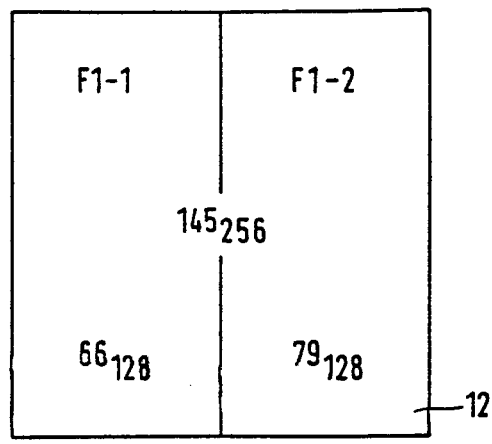

Referring to FIG. 1c, the individual process steps are illustrated with the aid of a scan field 12 with an assumed average gray value of 145. This gray value can be realized by 256 recording dots. In the following, the subscript number with the average gray values shows the number of recording dots with which the pertinent average gray value can be realized.

The scan field 12 is subdivided in a first subdividing step into two first fields of equal size F1-1 and F1-2. Each of these two first fields consists of 128 scan dots and is reproduced on a recording medium by 128 recording dots. The average gray value of each of the first field is determined. The average gray value of one first field cannot be reproduced with an accuracy of 1/256, because the first field is represented by only 128 recording dots. Thus, the accuracy with which the average gray value of a half of the scan field can be reproduced is less than the accuracy with which the average gray value of the entire scan field can be reproduced. The average gray value of the first field can be reproduced with an accuracy of only 1/128, because each first field corresponds to only 128 recording dots and with these 128 recording dots, only one division of the gray scale into 128 gray steps can be undertaken.

The determination of the average tonal values of both first fields F1-1 and F1-2 proceeds as follows: first, the average tonal value for one of the first fields, for example, for the first field F1-1, is calculated by averaging the tonal value of the individual scan dots of the first field F1-1. This gives the value $131_{256}$ for the example. The calculation started from a gray scale of 256 subdivisions to be realized by the recording dots of field F1-1. Because field F1-1 can be represented in the reproduction by only 128 recording dots, the tonal value $131_{256}$ determined on the basis of 256 recording dots must be converted to the corresponding average tonal value on the basis of 128 recording dots. This is done by dividing the gray value $131_{256}$ by 2 to yield $65.5_{128}$. Thus, 65.5 recording dots must be printed to be able to reproduce the average tonal value of the first field F1-1. Eventually, 66 recording dots are printed, so that an error of one half printed recording dot is made in the reproduction of the average tonal value of field F1-1. As was done through this example, fractions of integers can be randomly increased to the next higher integer or decreased to the next lower integer.

If the average tonal value of field F1-2 were to be determined as described above, the result would be a value $159_{256}$, which corresponds to $79.5_{128}$. To represent this average tonal value, 80 recording dots would be printed within field F1-2. Accordingly, 66 recording dots would be printed in the area of field F1-1 and 80 recording dots in the area of field F1-2, so that 146 recording dots would be printed for the entire scan field 12. However, only 145 recording dots should be printed for the exact representation of scan field 12. To avoid this error in the number of recording dots to be printed within the scan field, the average gray value of field F1-2 is not calculated by averaging the gray values of the recording dots of field F1-2, but rather comes from the difference between the number of recording dots to be printed for the corresponding scan field and the number of recording dots to be printed for field F1-1. Therefore, the average tonal value thus determined for field F1-2 is $79_{128}$.

The average gray value of F1-1 can also be determined by adding the 8 bit binary codes for the scan elements of field F1-1 by means of a digital adding device. The highest 7 bits yield, after rounding up or down, the average gray value of field F1-1 on the basis of 128 recording dots and also the equal number of recording dots to be printed for field F1-1.

The process described here for the determination of the average gray values of the fields resulting from a subdividing step is carried out for each succeeding subdividing step. This assures that the total number of recording dots to be printed for a scan field remains constant and the average gray value of the scan field, considered as a whole, can be reproduced with the greatest accuracy.

Figure 1D:
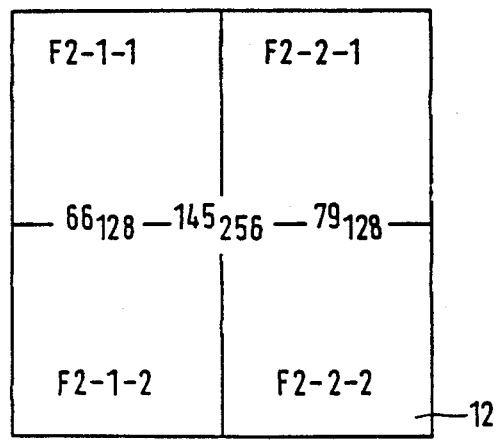
Figure 1E:
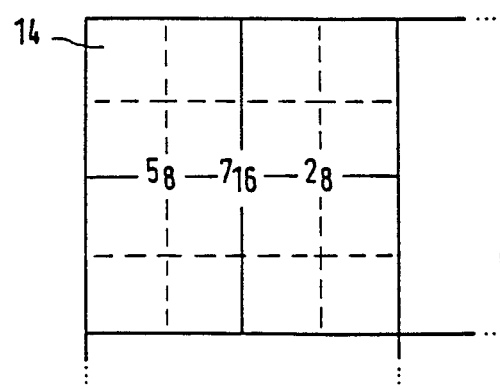
Figure 1F:
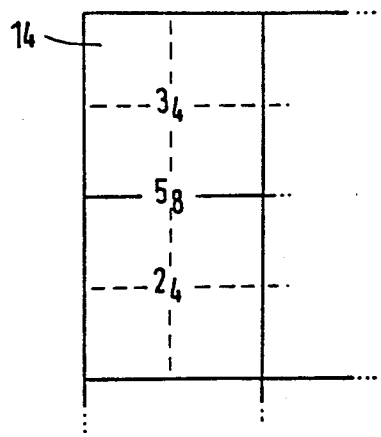
Figure 1G:
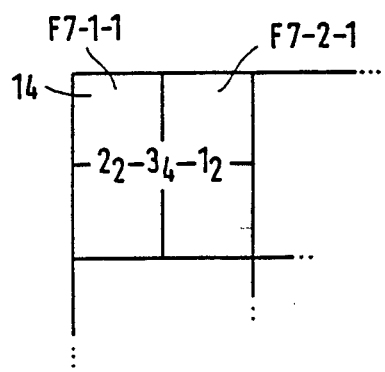
Figure 1H:
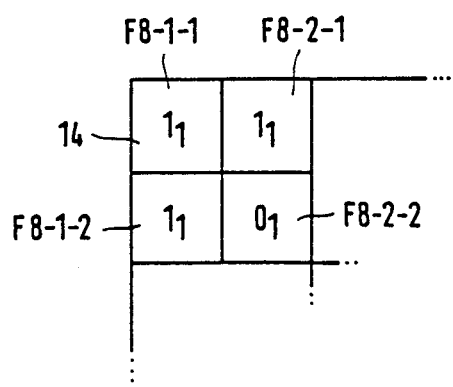

The second subdividing step is illustrated as follows with the aid of FIG. 1d. The first fields F1-1 and F1-2 are subdivided respectively in the second subdividing step into two second fields F2-1-1 and F2-1-2 and F2-2-1 and F2-2-2, respectively, of equal size. After the second subdividing step, the scan field 12 is thus subdivided into four quarters. The average gray value is determined for one of the second fields (e.g., F2-1-2) originating from one of the first fields (e.g., F1-1) by averaging the gray values of the individual scan dots of this second field (e.g., F2-1-2). Because each second field can be represented by 64 recording dots, the average gray value of a second field can be reproduced only with 1/64 accuracy. For this example, the average gray value so calculated for the second field F2-1-2 is $142_{256}$. This corresponds to an average gray value of $35.5_{64}$. That is, randomly rounding down to the nearest integer, 35 recording dots will be printed within the second field F2-1-2. This value results from the highest 6 bits of the average tonal value in binary code for the second field F2-1-2. Because the number of recording dots to be printed in the second field F2-1-1 and F2-1-2 must equal the number of recording dots to be printed in the first field F1-1, the average gray value $31_{64}$ must be assigned to the second field F2-1-1. Calculation of the average gray value of the individual scan dots of the second field F2-1-1 would given an average value of $120_{256}$, that is $30_{64}$, but the average gray value of the second field F2-1-1 must be $31_{64}$. This error is acceptable so that the total number of the recording dots to be printed within the second fields F2-1-1 and F2-1-2 equals the number of the recording dots to be printed in the first field F1-1.

The average gray values of the second fields F2-2-1 and F2-2-2, which originated from the first field F1-2, are calculated by the same method.

It can be stated that the average gray value of the individual subfields is reproduced with decreasing accuracy as the subdivision of the scan field becomes increasingly finer. However, this does not have an adverse effect, because the eye sees the progressively smaller subfields at correspondingly progressively smaller visual angles and in any case, can recognize their gray values only with progressively less certainty. As subdivision increases, the errors that become progressively larger in the determination of the average gray values are thus not visually perceptible. This can even go to the point where the number of recording dots to be printed in a field can be raised (or lowered) by one without it being perceived as a flaw. It was exactly this latitude that was used in the determination, as described above, of the average gray value of field F2-1-1. It is critical for the average gray value of a scan field 12 to be reproduced almost exactly by a corresponding number of printed recording dots. This is achieved directly in the above described determination of the average gray values of the fields originating from a subdividing step.

Figure 1I:
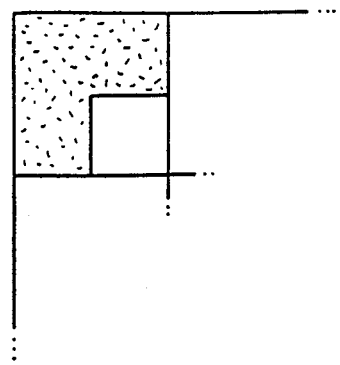

In six further subdividing steps, which are shown stepwise in FIGS. 1e–1h, the second fields of the second step are subdivided further. Ultimately, the scan field 12 is divided after the eighth subdividing step down into each individual scan dot. It is assumed in FIG. 1h that the seventh field F7-1-1, which is the origin of both eighth fields F8-1-1 and F8-1-2 from the eight subdividing step, shows an average gray value of $2_2$. For the representation of this gray value, both eighth fields F8-1-1 and F8-1-2, that is, the corresponding recording dots, must be printed. The distribution of the recording dots to be printed is not obvious beforehand in the case of both eighth fields F8-2-1 and F8-2-2. The "average" gray value of both of these eighth fields must be determined first. The "average" gray value of one of these eighth fields equals, however, the gray value of one scan dot. This gray value can nevertheless be reproduced only either by one print or by one no-print dot. It is assumed in the example of FIG. 1h that the gray value of the scan dot corresponding to the eighth field F8-2-2 is $117_{256}$. If this gray value is converted to the gray scale that can be represented by a single recording dot and that accordingly is subdivided into only two areas (namely, print or no-print), the eighth field F8-2-2 is thus represented by one no-print recording dot. Therefore, the eighth field F8-2-1 must be reproduced by one print dot. FIG. 1i shows which of the recording dots 14 corresponding to the upper left corner of the scan field according to FIG. 1b are printed in the example selected here.

The maximum possible resolution of the original is achieved by the subdivision of each scan field into fields, the sizes of which correspond to one scan or recording dot. The division of the original into scan fields with an edge length of about 300 μm permits a resolution of only 30 lines/cm (1/cm. This resolution is too low for the exact reproduction of details in the original. In any event, the division into scan fields about 300 μm × 300 μm would also only be selected to fulfill the minimum requirements for tonal value scanning. The desired resolution is achieved by the stepwise subdivision of the scan field as described above. The subdivision of the scan field into quarters doubles the resolution, subdivision into sixteenths quadruples the resolution and so on. In the limiting case, the scan field can be subdivided 256 times to achieve the highest possible resolution, 500 1/cm in the example (one cm of the original is thus subdivided into 500 lines 20 μm wide, the width of a recording dot).

The average tonal value of the fields is reproduced progressively less accurately as the scan field is divided into progressively smaller fields. However, as described above, this is not visually perceptible. Thus, image originals can be recorded by this process with, on one hand, very high resolution and, on the other hand, adequate tonal value gradations. Therefore, neither losses in detail reproduction nor losses in tonal value reproduction are visually perceptible.

Figure 2A:
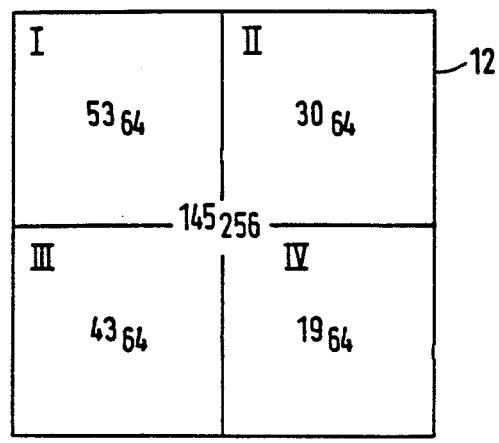
Figure 2B:
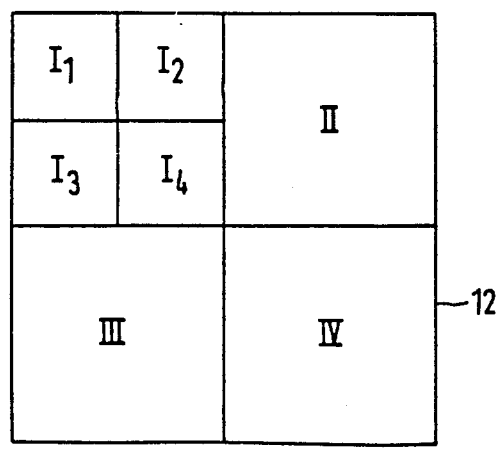
Figure 2C:
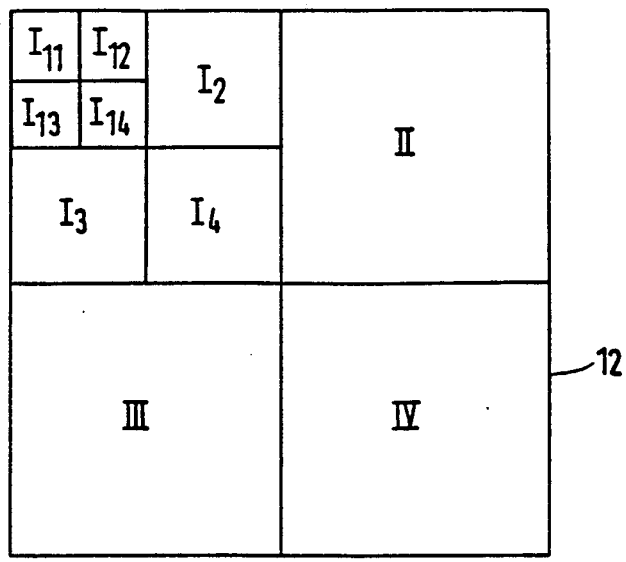
Figure 2D:
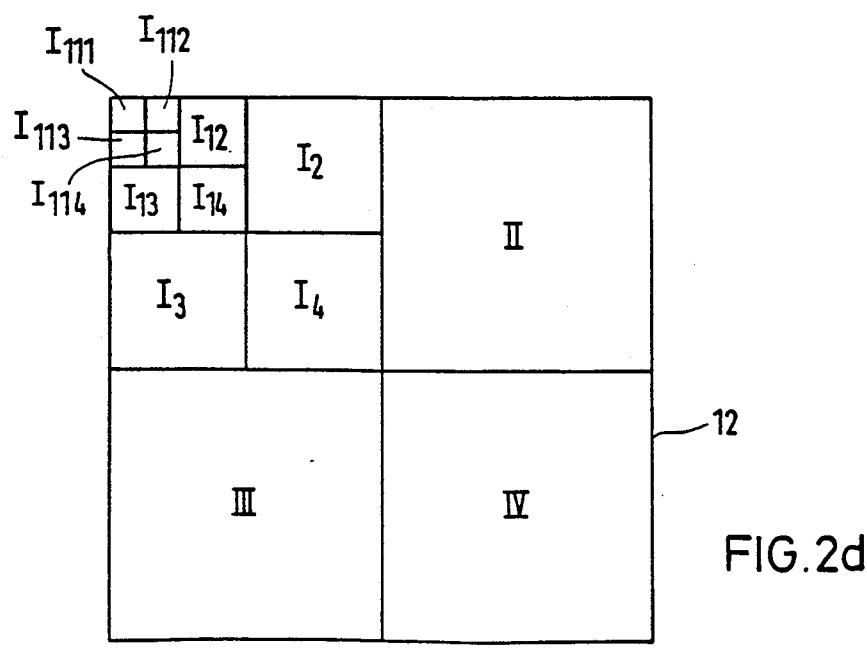

FIGS. 2a and 2d show another process variation, in which the scan field 12 is subdivided in four subdividing steps into the individual scan dots. A subfield is subdivided in each subdividing step into four equal smaller subfields. The first subdividing step is shown in FIG. 2a. It should be assumed again that the average gray value of scan field 12 is $145_{256}$. In the first subdividing step, the scan field is subdivided into four first fields I, II, III and IV. The average tonal value of three of these first fields is determined next by averaging the tonal values of the scan dots of the pertinent first fields. For example, this gives the following average gray values:

Field I: $210_{256} = 52.5_{64} = 53_{64}$

Field II: $120_{256} = 30_{64}$

Field III: $170_{256} = 42.5_{64} = 43_{64}$.

The average gray values of the individual first fields calculated on the basis of 256 recording dots are thus converted into an average tonal value on the basis of 64 recording dots, because each first field corresponds to 64 scan or recording dots. The average tonal value of the first field IV is now given as the difference between the sum of the average gray values of the first fields I and III and the number of recording dots to be printed in the scan field 12. Therefore, the average tone value of the first field IV is $19_{64}$. If the average tonal value of the first field IV had been determined by averaging the tonal values of the scan dots of field IV, an average tonal value of $80_{256} = 20_{64}$ would have resulted. Actually, however, 19 rather than 20 recording dots will be printed in the area of the first field IV. This procedure will compensate for the error made in the average gray value determination of the first fields I and III.

Each of the first field I to IV is subdivided further in three additional subdividing steps, as is shown in FIGS. 2b to 2d for the first field I. The average gray values are determined for three of the four fields originating from a subdividing step. The average gray value of the last of these four fields is established in such a way that the sum of the recording dots to be printed in the four fields equals the number of recording dots to be printed for that field from which the four fields originated. After the fourth subdividing step, scan field 12 is subdivided into fields of the size of a scan or recording dot. Four of these fields, namely $I_{111}$, $I_{112}$, $I_{113}$ and $I_{114}$, are shown in FIG. 2d.

With the procedure variation shown in FIGS. 2a to 2d, a scan field 12 can be subdivided in only four steps into the scan or recording dots, respectively. Thus, the procedure can be run more quickly.

Until this point, the process has been described for the case in which the scan resolution equals the recording resolution, or, in other words, the size of a scan dot equals that of a recording dot. However, it is also quite likely that the scan resolution is twice as great as the recording resolution. This means that four scan dots will be represented by one recording dot. If it is assumed again that a scan dot has the size of a square with an edge length of 20 μm, then the original would have been scanned with a resolution of 500 1/cm, but reproduced with a resolution of 250 1/cm. In such a case, the subdivision of the scan field down to the individual scan dots would be pointless, because an individual scan dot can not be reproduced on the recording medium. The size of the fields into which the scan field can be subdivided at most is determined, therefore, by the size of a recording dot.

Figure 3:
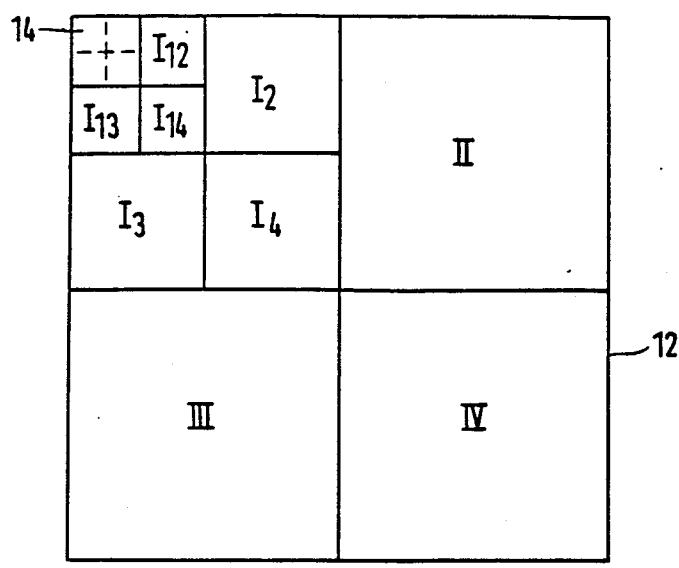

FIG. 3 shows the fields into which the scan field 12 is subdivided in the case of the procedure shown in FIGS. 2a to 2d. The first fields I to IV originate from the first step, while the second fields $I_1$ to $I_4$ originate from the second step (FIG. 3 shows the subdivision into second fields only for the first field I). The third and last subdividing step results in the third fields, of which the fields $I_{11}$, $I_{12}$, $I_{13}$ and $I_{14}$, which originated from the second field $I_1$, are indicated in the figure. The sizes of the third fields correspond exactly to the size of a recording dot. However, four scan dots in the original correspond to the recording dot.

Because the 256 recording dots of the original can be reproduced only by 64 recording dots on the recording medium, the average tonal value of a scan field 12 can be reproduced only in 64 discrete tonal value steps. The calculation of the average tonal value of a scan field by averaging the tonal values of the 256 scan dots of the scan field thus has an accuracy of 1/64. The average tonal value of the first fields I to IV can correspondingly be reproduced with an accuracy of 1/16 and the average tonal value of the second fields $I_1$ to $I_4$ with only an accuracy of 1/4. After the third subdividing step, the scan field 12 is finally divided into the third fields, which are as large as a recording dot. only the "average" tone values "0" and "1" are possible for the third fields. This means that the recording dots are either printed or not printed.

The process can also be used if, as in the case of FIG. 3, the scan resolution is twice as great as the recording resolution, or more generally stated, if the scan resolution is greater than the recording resolution. In all of these cases, several scan dots of the original correspond to one recording dot on the recording medium. As a result, some slight detail perception is lost in the reproduction, but the process is also less expensive.

Figure 4:
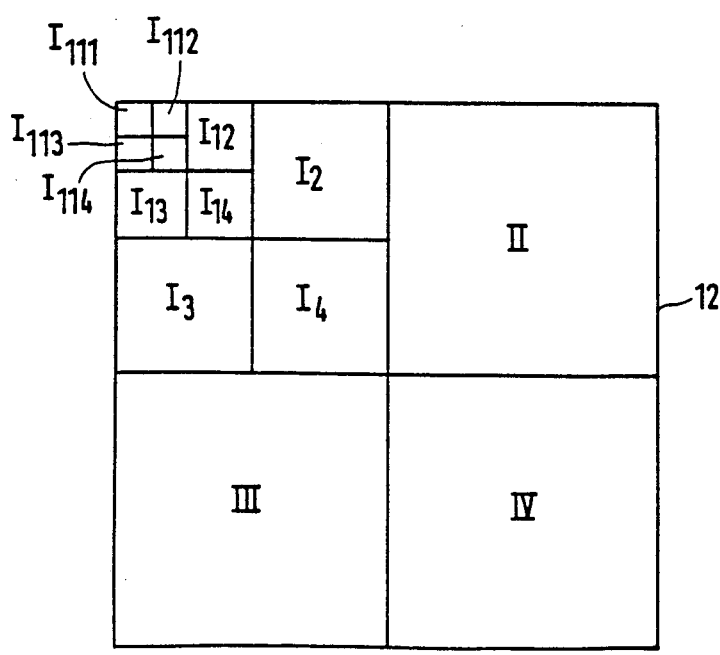

With the aid of FIG. 4, the course of the process is illustrated for the case of the scan resolution being less than the recording resolution. This can be the case, for example, if maintaining definition in the reproduction of an original is not unconditionally necessary, and it suffices, therefore, to scan the original less accurately and to record it with that much higher detail. It is assumed for the case shown in FIG. 4 that the scan resolution is half as great as the recording resolution. This means that one scan dot of the original is represented by four recording dots on the recording medium. In this case, the scan field 12 is subdivided into the smallest fields, which have the size of a scan dot. The scan field 12 shown in FIG. 4 is composed of 64 scan dots, which have the size of field $I_{12}$, and is represented on the recording medium by 256 recording dots, which each have the size of field $I_{111}$. The average tonal value of a scan field 12 can thus be represented on the recording medium by any of 256 possible tonal values, that is, with an accuracy of 1/256.

The subdivision of the scan field 12 proceeds in four subdividing steps, as was illustrated in connection with FIGS. 2a to 2d. After the third subdividing step, the scan field 12 is subdivided into the third fields, which the fields $I_{12}, I_{13}$ and $I_{14}$ represent. The size of the third fields corresponds exactly to one scan dot. The tonal value of the third fields can therefore be represented by four recording dots. For example, none of the four recording dots would be printed for the tonal value "0" of a scan element, whereas one recording dot would be printed for the tone value "1", two recording dots for the tonal value "2", three recording dots for the tonal value "3" and four recording dots for the tonal value "4". The distribution of the scan dots to be printed corresponding to the tonal value can be established beforehand for each tonal value: however, it is also practicable not to determine, according to a definite pattern, the distribution of a number of recording dots to be printed corresponding to the tonal value to be realized.

The scan resolution in the above described example is half as great as the recording resolution. Thus, four recording dots on the recording medium correspond to one scan dot of the original. The tonal value of a scan dot is represented by four recording dots. If the scan resolution is one fourth of the recording resolution, one scan dot or its tonal value, respectively, is represented by 16 scan dots. Sixteen tonal values can be represented with these 16 scan dots. The process is also still applicable in this instance. However, care should be taken so that the number of tone value steps per scan dot or the number of divisions of recording dots to be printed is not too large, for example not larger than 25. This means that the recording resolution should be at most five times greater than the scan resolution, so that images can be recorded at relatively low cost with tolerable losses in definition compared to the original.

The basis of this invention is a process for the recording of semihalftone images in which originals are recorded with very high resolution and adequate tone gradations.

To achieve this objective, the invention provides that each scan field is subdivided in at least one subdividing step into subfields, that sufficient consecutive subdivisions are performed until the subfields are of a size corresponding to the ratio of scanning to recording resolution, and that, after each subdivision, the average tonal values are determined for the subfields arising from a partial field of the previous subdivision, so that the sum of the average tonal values of the resulting subfields is equal to the average tonal value of that subfield of the preceding subdivision from which the subfield originated.

Within the scope of this invention, "recording" means the reproduction of optically scanned originals as well as the reproduction of originals stored on data carriers, both types of reproduction as semihalftone images.

In the process in accordance with the invention, each scan field is subdivided in at least one subdividing step into subfields, which are of a size corresponding to the ratio of scanning to recording resolution. If, for example, the ratio of scanning to recording resolution is one, that is, if the scan dots are the same size as the recording dots, the subfields are the size of a scan or recording dot, respectively. In this case, each scan field is subdivided in consecutive subdividing steps into the individual scan dots. Depending on how many scan dots are collected into a scan field, multiple subdividing is possible. Following each subdividing step, the average tonal values of the subfields arising from that subdividing step are made equal to the average tonal value of that subfield of the previous subdividing step from which the subfields originated. Thus, a tonal value equalization is undertaken from one subdividing step to another, so that the error in the determination of the tonal values of the subfields arising from a subdivision is not magnified.

The purpose of subdividing the original into scan fields is to reproduce exactly the average of the tonal values of the original in the areas defined by the size of the scan field. For good reproduction of an original, it is critical, among other things, that the tonal values of the original be reproduced almost exactly. For this purpose, individual areas of the original, the above scan fields, are considered and it is required that the average tonal value of these areas be reproduced exactly in the recording. The average tonal value of a scan field is calculated by determining the average of the tonal values of all of the scan dots contained in the scan field.

To be able to record an original with the least possible loss in definition, or stated otherwise, with the most accurate reproduction of details, the scan field is subdivided in multiple subdividing steps into first, second, third, etc. subfields. The scan field itself affords only a relatively low resolving capability, inasmuch as it was intended only for the purpose of fulfilling minimum requirements with respect to tonal values. The desired resolution capability and consequently, reproduction of the original with the desired definition is achieved by the stepwise subdivision of the scan field. The individual sections of the scan field are naturally smaller than the whole, resulting in greater resolution than is possible by the scan fields. This fact is illustrated in the following with the aid of an example.

It has been shown that the human eye can distinguish visually up to about 150 tonal value steps (thus, in the case of a black-white image, about 150 gray steps from black to white). Therefore, the tonal value of a scan field should be able to be reproduced by some of the 150 tonal value steps. Because the original is reproduced only by individual recording dots with the tone value "print" or "no-print", a scan field must be reproduced by at least 150 recording dots. Depending on the number of recording dots printed for this scan field, 150 tonal value steps result.

The current conventional digital technique for image processing is suitable for the size of the scan field for the reason that it comprises 256 scan of recording dots, which corresponds to a quadrangular scan field of $16 \times 16$ scan or recording dots. The average tonal value of such a scan field can be recorded almost exactly, namely, by some of 256 tonal value steps (that is, with an accuracy of 1/256. For example, with a scan dot diameter of about 20 $\mu$m, the resulting scan field is 300 $\mu$m $\times$ 300 $\mu$m ($16 \times 20$ $\mu$m $= 320$ $\mu$m $\approx 300$ $\mu$m). Thus, 1 cm of the original can be subdivided into about 30 contiguous scan fields. The subdivision of the original into scan fields results in a resolution capability for the original of only about 30 lines/cm (30 1/cm). This is naturally too low to satisfy requirements with respect to definition and detail reproduction of the original. To achieve a higher resolution capability, the scan field is subdivided into multiple smaller subfields. The resolution capability of the subfields of the scan field increases according to the size of the subfields into which the scan field is subdivided. For example, subdivision of the scan field into four subfields doubles the resolution capability of the scan field; further subdivision of the individual subfields into four subfields of equal size quadruples resolution capability and so on. In the limiting case, the scan field can be subdivided 256-fold (namely, exactly into the individual scan dots), which achieves the highest possible resolution capability, 500 1/cm. In this case, the original would be reproduced in lines 20 $\mu$m wide. A 1 cm wide stripe in the original would be reproduced on the recording medium as 500 lines with a width of 20 $\mu$m.

By use of the process in accordance with the invention, originals are recorded or reproduced with very high resolution capability and with adequate tonal value gradations. Visual losses in detail or tonal value reproduction of the original are consequently almost imperceptible. Improved contrast (detail contrast) and consequently, the greatest possible image definition in the reproduction, is achieved by the detail resolution of the original (namely, by subdivision of the scan field into individual scan dots as in the extreme case). The original or image data can be subsequently processed very easily and quickly in digital form. Extensive calculations to avoid error accumulation in the determination of the average tonal values of the subfields, into which the scan field is subdivided, are eliminated, because tonal value equalization is undertaken from one subdividing step to another.

It is advantageous for the subfields to be subdivided in one or more subdividing steps into subfields of equal size and for the number of subfields, into which they are subdivided, to be equal in all subdividing steps. In this way, the process can be performed especially easily. In view of the established digital technique preferred for image processing, it is especially suitable to undertake the subdivision of the scan field by means of digitizing steps, that is, to split the scan field in the first subdividing step into two first subfields, these two first subfields in the second subdividing step into two second subfields and so on (the scan field is thus subdivided after the second subdividing step into four second subfields of equal size). The tone value of each individual scan dot is also in the form of binary code. The length of this binary code is determined by the number of average tonal value steps to be realized in a scan field (the case of 256 tonal value steps per scan field results in a binary code of 8 bits). The average tonal values of the individual subfields can then be determined by addition of the tonal values of the scan dots of that subfield. The highest 7 bits of this sum give the average tonal value of a first subfield, if the scan field, as described above, can be reproduced in 256 tonal value steps. Correspondingly, the highest 6 bits of the tonal value sum from the tonal values of the scan dots of the second subfield give the average tonal value of this second subfield, while the highest 5 bits of the tonal value sum from the tonal values of the scan dots of the third subfield give the average tonal value of the third subfield, and so on. The data on average tonal values required for performing the process can be very easily and quickly calculated in this development of the invention.

In a preferred embodiment of the invention, the average tonal value of the scan field is determined with an accuracy of 1/k and the average tonal value of the i'th subfields arising from the i'th subdividing steps is determined with an accuracy of m/k, in which m is the aspect ratio of the scan field to the corresponding i'th subfield. The accuracy with which the average tonal value is determined for an i'th subfield arising from the i'th subdividing step declines as the subfield becomes smaller. For example, if a scan field is reproduced by 64 recording dots, the average tonal value of the scan field can be reproduced with an accuracy of 6 bits, that is, to 1/64. If this scan field is subdivided in the first subdividing step into two equal size first subfields, each of these subfields consists of 64/2 = 32 recording dots. With 32 recording dots, however, the tonal value scale can be reproduced only in 32 steps. The average tonal value is thus reproduced with an accuracy of m/k = 2/64 = 1/32. Hence, further processing of the data is simplified, because it is pointless to process further the average tonal values of the individual subfields with an accuracy that cannot be reproduced on the recording medium.

It is advantageous that the average tonal values of the n i'th subfields, which arise in the i'th subdividing step from an (i-1)'th subfield of the previous subdividing step, be determined so that the average tonal value for (n-1) i'th subfields is determined with an accuracy of m/k, in which m is the aspect ratio of the scan field and the i'th field, and so that the average tonal value of the last i'th subfield is determined as the difference between the average tonal values of the subfield of the previous subdividing step and the sum of the average tonal values of the (n−1) i'th subfields. In this development of the invention, the tonal value of the n (i'th) subfield originating in the i'th subdividing step is determined such that the average tonal value of (n−1) i'th subfields is determined by averaging the tonal values of the respective scan dots representing these i'th subfields. The accuracy with which the average tone values of the (n−1) i'th subfields is determined is based on the considerations outlined above. The average tonal value of the last i'th subfield is the difference between the average tonal value of that (i−1)'th subfield of the previous subdividing step, from which originated the n i'th subfields of the i'th subdividing step, and the sum of the calculated average values of the (n−1) i'th subfields. In this way, an equalization of the average tonal values of the n subfields takes place in each subdividing step and in the average tonal value of the corresponding (i−1)'th subfield of the previous subdividing step.

The rounding errors made in the determination of the average tone values of the (n−1) i'th subfields as a result of declining accuracy are not troublesome, because the human eye sees the smaller subfields at a correspondingly smaller visual angle and therefore, can recognize their tonal values with progressively less accuracy. Thus, the rounding errors in the average tonal values of the individual areas is actually of no practical importance, because they are not visually perceptible. The average tonal values of the subfields can even be rounded up or down as desired, without it being visually perceptible. This means that the number of recording dots to be printed in a subfield can be increased or decreased around "1" without this error being visually recognizable. This flexibility in the development of the invention is used to harmonize the number of recording dots to be printed in the individual subfields exactly with total number of recording dots to be printed for the scan field. In this way, cumulative errors are precluded in the determination of the average tonal values of the subfields originating from the subdividing steps.

An advantageous extension of the invention is characterized in that $4n \geq 4$ recording dots are collected into a scan field of 2n lines and 2n columns and the average tonal value of the scan field is determined with an accuracy of $1/4^n$, and in that a subfield is subdivided in one subdividing step into four equal subfields and the average tonal values of the four subfields, which originated from the i'th subdividing step, are determined with an accuracy of $1/4^{n-i}$. In this variation of the process, the scan field is subdivided in only n subdividing steps into the individual scan dots and each subfield originating from a subdividing step is subdivided in the succeeding subdividing step into four subfields of equal size. The processing of the tonal value data of the scan dots of the scan field and the subdivision of the scan field into the subfields are thus accelerated so that the errors incurred in the determination of the average tone values of the subfields are tolerable.

It is advantageous for the scan field to be subdivided for a ratio of scan to recording resolution greater than "1" by the successive subdivision into the smallest subfields, which are each equal to the size of a recording dot. This situation should be illustrated with the aid of an example. Let it be assumed that a scan dot shows a diameter of 20 μm and a recording dot a diameter of 40 μm. Thus, the original is scanned in lines 20 μm wide, whereas it is reproduced in lines 40 μm wide. This means that four scan dots correspond to one recording dot. Thus, the original is scanned twice as minutely as it can be reproduced. This means that a subdivision of the scan field into subfields that shows the same size as a scan dot is pointless, because this individual scan dot cannot be represented on the recording medium. Therefore, the subdivision should be performed only to the step where the resulting subfield has the size of a recording dot. If the scan resolution is greater than the recording resolution, the process proceeds more quickly, because fewer subdivisions are performed.

On the other hand, another advantageous extension of the invention is for the scan field to be subdivided for a ratio of scan to recording resolution smaller than or equal to 1 by successive subdividing steps into the smallest subfields, which equal the size of a scan element. If the recording resolution is greater than or equal to the scanning resolution, that is, if the original is reproduced in as fine detail or almost as fine detail as it has been scanned, the scan field is subdivided into the smallest subfields, which have the size of a scan dot. A ratio of scan to recording solution of 1 yields in this way the most accurate reproduction of the original.

If the scan resolution is smaller than the recording resolution, a scan dot of the original is represented on the recording medium by a number of recording dots corresponding to the ratio of scan to recording resolution. For example, if the scan resolution is half as great as that of the recording resolution, a scan dot is represented by four recording dots. Thus, the tonal value of a scan dot is also reproduced by four recording dots, which can take the tone value "print" or "no-print". The process can also be so used in cases where the scan resolution is less than the recording resolution. This is the case, for example, in photographic and electrophotographic recording or in recording by means of a laser. Thus, it can happen that the originals show lower definition or the definition is not critical to the image and for this reason, it suffices to scan the originals with less accuracy, that is, less minutely and then to select the recording resolution which is that much higher. If the ratio of scan to recording resolution is smaller than 1, the distribution of the recording dots to be printed for each possible tonal value, which can be represented by the number of recording dots corresponding to one scan dot, is either established beforehand or in random. For example, if a scan dot is reproduced by four recording dots, four tonal values in addition to white can be realized with the recording dots. The position of the recording dot to be printed for a specific tonal value can thus be either established beforehand and therefore always be constant, or be random. The latter alternative has an advantage in that the reproduction of an area of the original with the same tonal value over the entire area does not result in a "recording dot pattern", which could possibly have adverse effects.

It is advantageous to arrange the scan and recording dots respectively in an orthogonal matrix. With such an arrangement of the scan dots, the scan field can be very easily subdivided into individual subfields and the individual scan dots can be very easily arranged in the individual subfields.

It is preferable to arrange the scan and recording dots respectively in an orthogonal matrix, the lines and columns of which are alternately shifted reciprocally. In this arrangement of the scan and/or recording dots, one scan and/or recording dot has six so-called close neighbor dots, that is, the scan or recording dots are arranged respectively between the scan and/or recording dots of the adjacent series. The lines and/or columns of such a matrix are alternately shifted reciprocally. With such an arrangement, the original can be scanned significantly more accurately on one hand, and on the other hand, the image can be recorded significantly more accurately, because the size of the interstices among the individual scan and/or recording dots is minimized as a result of the "high packing density" of the dots. This hexagonal arrangement is especially advantageous with small scan and recording dots.

The process in accordance with the invention can be used not only for the recording of monochrome, but also for the recording of polychrome semihalftone images, which consist of multiple additive or subtractive basic colors. In this instance, the above described process is conducted for each of the basic colors and the resulting monochrome semihalftone images are combined in an overlay. For each additive and/or subtractive basic color, a specific tonal value is assigned on scanning to each scan dot. In the subsequent subdivision of a scan field, the average tonal value of the pertinent basic color of the resulting subfield is determined or calculated as described above. The individual recording dots can be either colored completely with the corresponding additive or subtractive basic colors or not colored at all. In the recording of polychrome images by this process, the known techniques for avoiding moire phenomena can also be used.

The process can also be used for the recording of three dimensional originals. The original is analyzed by scan-resolution, is subdivided into multiple scan volumes with K scan volume elements and the spatial average volume is determined for each scan volume. The original is reproduced on a recording medium by individual recording volume elements with the tone value "print" or "no-print".

In the recording of the three dimensional original, the invention provides that each scan volume is subdivided in at least one subdividing step into subvolumes, that sufficient subdividing steps are performed until the subvolumes are of a size corresponding to the ratio of scan to recording resolution, and that, after each subdividing step, the average tonal values are determined for the subvolumes originating from a subvolume of a prior subdividing step. The sum of the average tonal values of the resulting subvolumes is equal to the average tonal value of that subvolume of the prior subdividing step from which the subvolumes originated. The average spatial tonal values of the i'th volumes, which originated from a (i−1)'th volume, are determined exactly as in the process for the recording of two dimensional originals.

The above described extensions or variations of the process for the recording of two dimensional originals also apply analogously in the case of the recording of holographic images. The considerations involved in the variations must simply be carried over into the three dimensional realm.

For the recording of holographic images, the scan and recording volume elements respectively can be arranged either in an orthogonal three dimensional matrix or in a three dimensional matrix with the most closely packed hexagonal structure. Although the first possibility permits a simple clear subdivision of the three dimensional original into the first, second, third volumes and so forth, the second possibility offers the advantage that the three dimensional original can be recorded or reproduced by arrangement of the scan of recording volume elements with less information loss; in the most closely packed hexagonal structure, the size of the interstices among the individual volume elements is minimal.

In the process in accordance with the invention, an original is scanned linewise and the tonal value of each scan dot is determined. A number of scan dots are collected into a scan field. The average tonal value of each scan field is determined by averaging the tonal values of the scan dots of these scan fields. The original is reproduced on a recording medium by individual recording dots that can take the tone value "print" or "no-print". Thus, several recording dots correspond to a scan field of the original. By printing a specific number of recording dots, the tone value of the scan field can be reproduced almost exactly at its average. The distribution of the recording dots to be printed for a scan field is determined by subdivision of the scan field into the smallest subfields. Thus, the scan field is subdivided in at least one subdividing step into these smallest fields and the average tonal value of each resulting subfield is determined so that the number of recording dots to be printed in all subfields of a scan field corresponds to the average tonal value of the scan field.

The subdivision of the original into scan fields assures that the reproduction of the respective tonal values of the original is almost exact "areawise", namely, for the scan fields considered. To be able to reproduce accurately changes in tonal value steps within the scan fields, the scan fields are subdivided into individual increasingly smaller subfields, so that the average tonal value of the scan field itself is reproduced with the greatest possible accuracy.

We claim:

1. A process for recording semihalftone images, in which process an original is analyzed by scan-resolution, is subdivided into multiple scan fields each with k scan elements and the average tonal value of each scan field is determined, and the original is reproduced on a recording medium with recording resolution by individual recording elements with the tone value "print" or "no-print", characterized in that each scan field is subdivided in at least one subdividing step into subfields, in that sufficient, consecutive subdividing steps are performed until the subfields show a size corresponding to the ratio of scan to recording resolution, and that, after subdividing step, the average tonal value is determined for the subfields originating from a subfield of the prior subdividing step, the sum of the average tonal values of the resulting fields being equal to the average tonal value of that subfield of the prior subdividing step from which the subfields originated, so that the sum of the numbers of recording elements of all subfields generated in one subdividing step equals the number of recording elements in the subfield which was divided in that one step.

2. The process in accordance with claim 1, characterized in that the subfields are subdivided in subdividing steps into subfields of equal size and that the number of subdivided subfields is equal in all subdividing steps.

3. The process in accordance with claim 1, characterized in that the average tonal value of each of the scan fields, is determined with an accuracy of 1/k and in that the average tonal value of the i'th subfields originating from the i'th subdividing step is determined for each with an accuracy of m/k, in which m is the aspect ratio of the scan field to the corresponding i'th subfield.

4. A process for recording semihalftone images, in which process an original is analyzed by scan-resolution, is subdivided into multiple scan fields each with k scan elements and the average tonal value of each scan field is determined, and the original is reproduced on a recording medium with recording resolution by individual recording elements with the tone value "print" or "no-print", characterized in that each scan field is subdivided in at least one subdividing step into subfields, in that sufficient, consecutive subdividing steps are performed until the subfields show a size corresponding to the ratio of scan to recording resolution, and that, after each subdividing step, the average tonal value is determined for the subfields originating from a subfield of the prior subdividing step, the sum of the average tonal values of the resulting fields being equal to the average tonal value of that subfield of the prior subdividing step from which the subfields originated, so that the sum of the numbers of recording elements of all subfields generated in one subdividing step equals the number of recording elements in the subfield which was divided in that one step, characterized in that the average tonal values of the n i'th subfields, which result in the i'th subdividing step from an (i−1)'th subfield from the prior subdividing step, are determined by ascertaining the average tonal value for (n−1) i'th subfields with an accuracy of m/k and in that the average tonal value of the last i'th subfield is determined as the difference between the average tone value of the (i−1)'th subfield of the previous subdividing step and the sum of the average tonal values of the (n−1) i+th subfields.

5. The process in accordance with claim 1, characterized in that $4^n \geq 4$ recording elements are collected into a scan field having $2^n$ lines and $2^n$ columns and the average tonal value of the scan field is determined with an accuracy of $1/4^n$, and in that one subfield is subdivided in one subdividing step into four equal size subfields, in connection with which the average tonal values of the four i'th subfields, which originate from the i'th subdividing step, are determined with an accuracy of $1/4^{n-1}$.

6. The process in accordance with claim 1, characterized in that the scan field for a ratio of scan to recording resolution greater than one is subdivided in consecutive subdividing steps into the smallest subfields, which each equal the size of a recording element.

7. The process in accordance with claim 1, characterized in that the scan field for a ratio of scan to recording resolution smaller than or equal to 1 is subdivided in consecutive subdividing steps into the smallest subfields, which are equal to the size of a scan element.

8. The process in accordance with claim 7, characterized in that, at the ratio smaller than one, the distribution of the recording elements is established beforehand for each possible tonal value, which can be represented by the number of recording elements corresponding to the ratio.

9. The process in accordance with claim 8, characterized in that, at the ratio smaller than 1, the distribution of the recording elements is random for each possible tonal value, which can be represented by the number of recording elements corresponding to the ratio.

10. The process in accordance with claim 1, characterized in that the scan elements and the recording elements are each arranged in an orthogonal matrix.

11. A process for recording semihalftone images, in which process an original is analyzed by scan-resolution, is subdivided into multiple scan fields each with k scan elements and the average tonal value of each scan field is determined, and the original is reproduced on a recording medium with recording resolution by individual recording elements with the tone value "print" or "no-print", characterized in that the scan elements and the recording elements are each arranged in an orthogonal matrix, the lines and columns respectively of which are alternately shifted reciprocally, each scan field is subdivided in at least one subdividing step into subfields, in that sufficient, consecutive subdividing steps are performed until the subfields show a size corresponding to the ratio of scan to recording resolution, and that, after each subdividing step, the average tonal value is determined for the subfields originating from a subfield of the prior subdividing step, the sum of the average tonal values of the resulting fields being equal to the average tonal value of that subfield of the prior subdividing step from which the subfields originated, so that the sum of the numbers of recording elements of all subfields generated in one subdividing step equals the number of recording elements in the subfield which was divided in that one step.

12. A process for recording polychrome semihalftone images, which are composed of multiple additive or subtractive basic colors, characterized in that the process of claim 1 is conducted for each basic color and the resulting monochrome semihalftone images are superimposed.

13. A process for recording three dimensional semihalftone images, in which an original is analyzed by scan-resolution, is subdivided into multiple scan volumes each with K scan volume elements and the average spatial tonal value of each scan volume is determined, and the original is reproduced on a recording medium with recording resolution by individual recording volume elements with the tone value "print" or "no-print", characterized in that each scan volume is subdivided in at least one subdividing step into subvolumes, in that sufficient consecutive subdividing steps are conducted until the subvolumes show a size corresponding to the ratio of scan to recording resolution, and that, after each subdividing step, the average tonal values are determined for the subvolumes originating from a partial volume from the prior subdividing step, the sum of the average tonal values of the resulting subvolumes being equal to the average tonal value of that subvolume of the prior subdividing step from which the subvolumes originated.

14. The process in accordance with claim 13, characterized in that the scan and recording volume elements are each arranged in an orthogonal three dimensional matrix.

15. The process in accordance with claim 13, characterized in that the scan and recording volume elements are each arranged in an orthogonal three dimensional matrix with the most dense, hexagonal close-packed structure.

16. A process for reproducing an image by scanning the image with a scanning dot having a predetermined area to obtain information related to the single tonal values of the image, and using the information to reproduce the image on a display medium by generating a multiplicity of recording dots of fixed predetermined tonal value and dimension, and of variable frequency per unit area, the improvement comprising:
   (1) detecting discrete tonal values for discrete areas of the image corresponding to the scanning dot area,
   (2) storing information corresponding to the discrete tonal values for the full image area to be reproduced,
   (3) defining at least one scanning field equivalent to a portion of an image area, containing k scan dots,
   (4) calculating the average tonal value of each scanning field by averaging the tonal values of each of the scanning dots within the field,
   (5) subdividing each of the scanning fields into at least two subfields, (6) calculating the average tonal value of the subfields such that the sum of the tonal values of the subfields equals the tonal value of the field which preceded the subfields, (7) repeating steps (5) and (6) until the number of scan dots contained in the subfield equals one or the ratio of the scan dot area to the recording dot area whichever is greater, and (8) generating on the display medium recording dots of fixed tonal value and dimension at a frequency and location to produce tonal values in each of the subfields in accordance with the calculated tonal values for each of the subfields.

17. The process in accordance with claim 1, wherein each scan field is reproduced by a number of recording elements at least equal to a number of discrete tonal values that can be used.

18. The process in accordance with claim 4, wherein each scan field is reproduced by a number of recording elements at least equal to a number of discrete tonal values that can be used.

19. The process in accordance with claim 11, wherein each scan field is reproduced by a number of recording elements at least equal to a number of discrete tonal values that can be used.

20. The process in accordance with claim 13, wherein each scan volume is reproduced by a number of recording volume elements at least equal to a number of discrete spatial tonal values that can be used.

21. The process in accordance with claim 16, wherein each scanning field is reproduced by a number of recording dots at least equal to a number of discrete tonal values that can be used.

22. The process in accordance with claim 20, wherein the number of recording dots is 256.

* * * * *